United States Patent [19]
Logsdon et al.

[11] 3,759,098
[45] Sept. 18, 1973

[54] APPARATUS FOR DETERMINING FLUID FLOW IN A CONDUIT

[75] Inventors: Hillard Glenn Logsdon; Ernest August Werder, both of Charlotte, N.C.

[73] Assignee: Aeronca, Inc., Pineville, N.C.

[22] Filed: Jan. 27, 1972

[21] Appl. No.: 221,186

[52] U.S. Cl. .............................. 73/205 R
[51] Int. Cl. ............................... G01f 1/00
[58] Field of Search ............... 73/205 R, 205 D, 73/205 L, 211, 212, 206

[56] References Cited
UNITED STATES PATENTS
| | | | |
|---|---|---|---|
| 1,940,921 | 12/1933 | Smith, Jr. | 73/205 R |
| 3,640,307 | 2/1972 | Drzala | 73/205 R |
| 3,129,587 | 4/1964 | Hallanger | 73/211 |
| 3,685,355 | 8/1972 | DeBaun | 73/212 |
| 2,687,645 | 8/1954 | Velten et al. | 73/211 |

*Primary Examiner*—Jerry W. Myracle
*Attorney*—Donald M. Seltzer et al.

[57] ABSTRACT

An open-ended housing is adapted to be communicatively connected to a conduit for receiving fluid flowing therethrough, and has a plate means defining an orifice within the housing for restricting the flow of fluid therethrough, with novel sensing means so arranged on opposite sides of the orifice as to sense relatively high static pressure at a plurality of points upstream of the orifice and to sense sub-atmospheric static pressure at a plurality of points downstream of the orifice, and a pressure responsive means is operatively connected to the sensing means for determining the differential pressure on opposite sides of the orifice.

10 Claims, 8 Drawing Figures

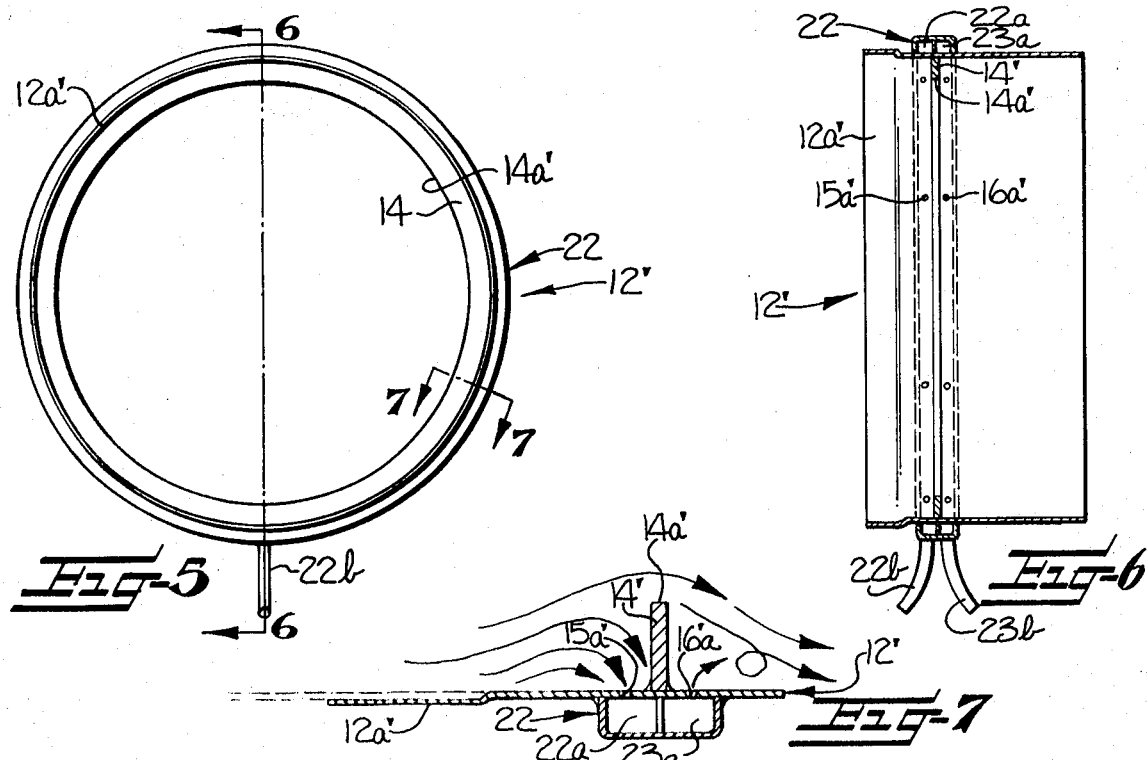
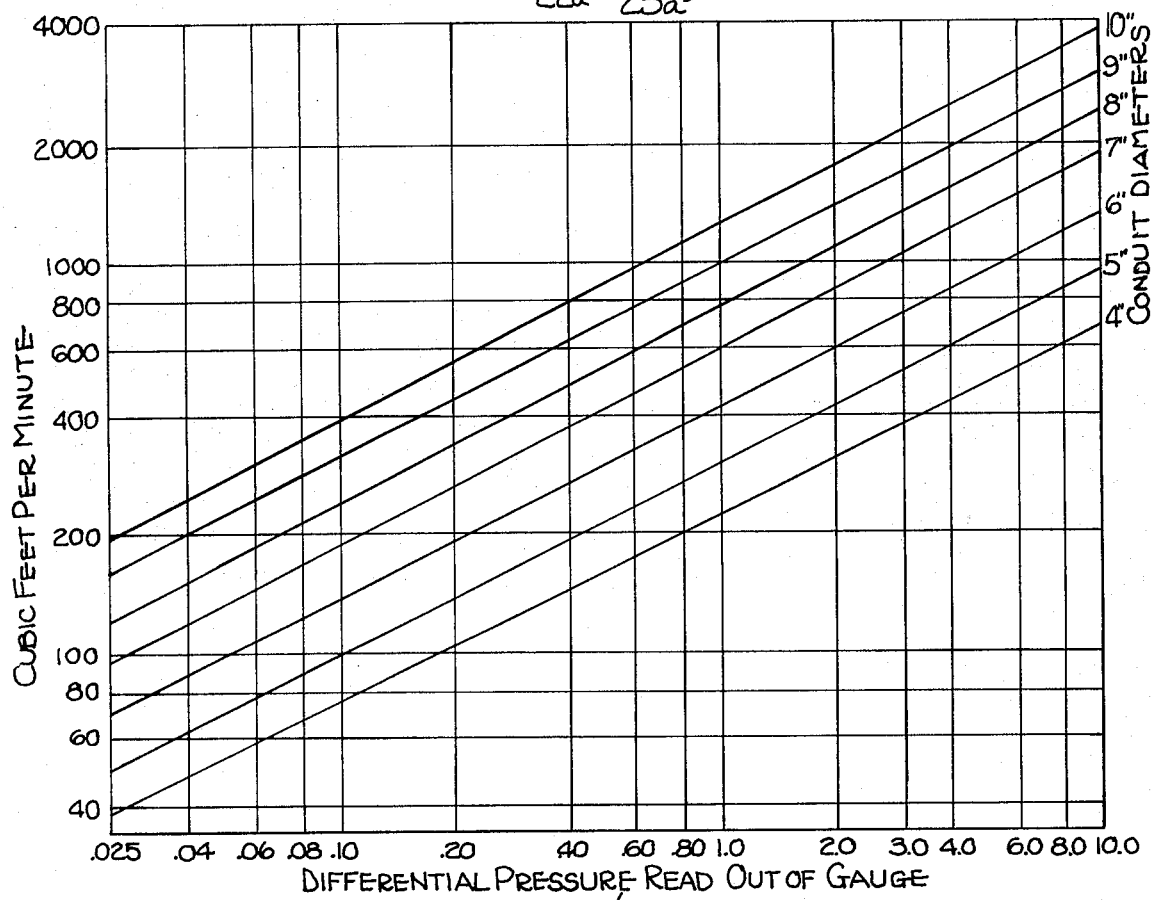

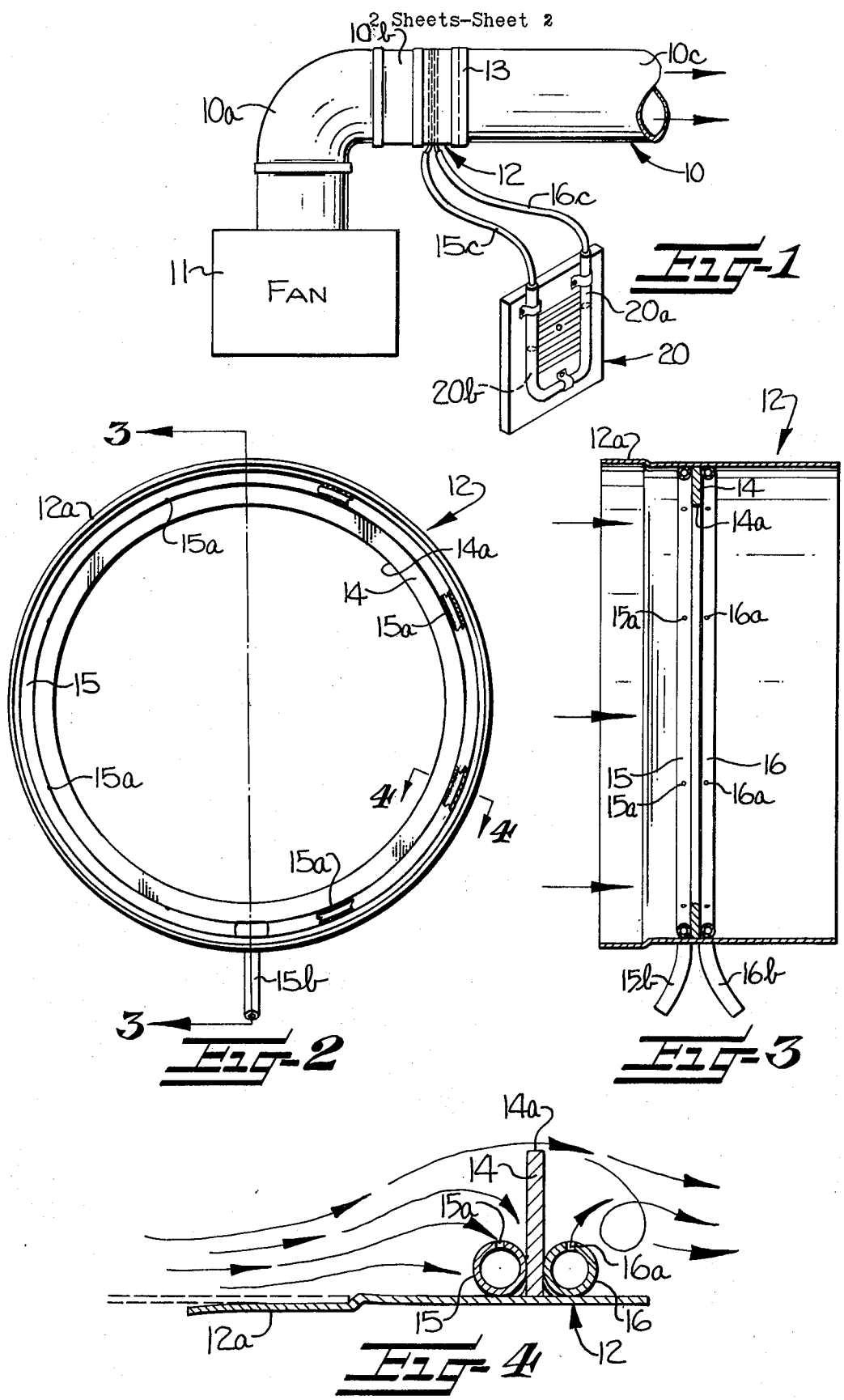

APPARATUS FOR DETERMINING FLUID FLOW IN A CONDUIT

This invention relates to an improved apparatus for obtaining a pressure differential of a fluid flowing in a conduit for operating a pressure responsive means, such as a manometer, a fluid motor, or the like.

The apparatus of this invention is especially useful for obtaining measurements of the volumetric rate of flow of air or other gaseous fluid in conduits or ducts such as are employed for directing gaseous fluid from a common source to various areas or from various areas to a central location, as in heating and air-conditioning systems. Heretofore, the measurement of the rate of flow in a conduit or duct has generally been obtained by placing a flow restricting orifice in the flow path and connecting suitable flow taps or pipes, extending from a pressure gauge or manometer, to the conduit at points spaced a substantial distance upstream and downstream, respectively, from the restricting orifice. Because of the somewhat spiral flow of air effected by a fan, for example, some form of air straightening means, such as a screen, had to be positioned a substantial distance upstream of and in a straight flow path from the restricting orifice so as to smooth out or straighten the flow of air before it reached the upstream tap. Otherwise, the pressure at the taps would fluctuate to such extent that a reasonably accurate read-out of the pressure drop across the taps could not be obtained. It is apparent that such an arrangement has required that flow rate measurements could only be made where there was a straight run of conduit or duct of considerable length; i.e., about 7 to 16 feet of a straight run of conduit or duct, depending upon the diameter thereof. Even then, an accurate and reliable read-out was not obtainable at the manometer under conditions where there was a very low volumetric rate of fluid flow in the conduit, since variations in read-out at the monometer would barely be perceptible.

It is therefore an important object of this invention to provide a simple and efficient apparatus for obtaining an amplified read-out of the pressure drop of the flow of fluid in a conduit, and which apparatus will operate efficiently in a turbulent flow path and therefore in a very short straight length of conduit or duct.

Another object of the invention is to provide apparatus of the type described which functions efficiently regardless of the direction of flow of gaseous fluid in a conduit system and through the apparatus.

Still another object is to provide apparatus of the type described which includes a restricting orifice of such large area therein that the apparatus may be permanently installed in a conduit system without unduly restricting the flow of gaseous fluid therethrough.

It is a more specific object of this invention to provide an improved apparatus for obtaining and sensing a pressure differential of a gaseous fluid flowing in a conduit, which apparatus comprises an open-ended housing adapted to be communicatively connected to a conduit for receiving the fluid flowing therethrough, plate means defining an orifice within the housing for restricting the flow of fluid therethrough, and sensing means positioned on opposite sides of the orifice for sensing relatively high static pressure at a plurality of points upstream of the orifice and for sensing static negative or sub-atmospheric pressure at a plurality of points downstream of the orifice. The sensing means is highly sensitive to changes in pressure and includes a series of ports on each side of the orifice extending around the interior of the housing and located radially outwardly of the orifice, with the ports facing inwardly toward the center of the housing. At least the downstream series of ports is located substantially closer to the plate means than the extent that the plate means projects into the housing, and pressure responsive means is operatively connected to each series of ports for determining the differential pressure on opposite sides of the orifice.

Some of the objects of the invention having been stated, other objects will appear as the description proceeds when taken in connection with the accompanying drawings, in which FIG. 1 is a schematic elevation of a first embodiment of the apparatus of this invention installed in a fluid flow conduit;

FIG. 2 is an enlarged end elevation of the first embodiment of the apparatus removed from the fluid flow conduit;

FIG. 3 is a transverse sectional view taken substantially along line 3—3 in FIG. 2;

FIG. 4 is a further enlarged fragmentary sectional view taken substantially along line 4—4 in FIG. 2;

FIG. 5 is a view similar to FIG. 2, but showing a second or modified form of the apparatus of this invention;

FIG. 6 is a transverse sectional view taken substantially along line 6—6 in FIG. 5;

FIG. 7 is an enlarged fragmentary sectional view taken substantially along line 7—7 in FIG. 5; and FIG. 8 is a graph plotted to show the rate of flow of air or other gas through various sizes of conduits as related to variations in differential pressure sensed by apparatus constructed in accordance with this invention.

Referring more specifically to the drawings, in FIG. 1, the first embodiment of the apparatus is shown installed in a conduit or duct system 10 through which air or other gaseous fluid is caused to flow by any suitable pump means shown schematically as a fan 11 which may be of the reversible type. To exemplify the utility of the apparatus, its housing 12, to be presently described, is shown positioned closely adjacent an elbow 10a and is interposed between a relatively short conduit 10b and a longer conduit 10c of the conduit system 10. Elbow 10a is a representative of any structure of a conduit system which may divert or otherwise disturb the flow of the fluid adjacent and upstream of the present apparatus such as to preclude a steady, reliably measurable, pressure differential across a conventional orifice-type measuring instrument. Also, the longer conduit 10c may be omitted, if desirable.

As shown in FIGS. 1 and 2, housing 12 is in the form of a relatively short tubular body which is preferably circular in cross-section and of an internal diameter corresponding to that of conduits 10b, 10c. The upstream end of housing 12 may be provided with a relatively short annular bell portion 12a of greater internal diameter than the remainder of the housing 12 for receiving therein the corresponding end of conduit 10b so that the inner surfaces of conduit 10b and housing 12 may be substantially flush with one another. The other end of housing 12 may abut the corresponding end of conduit 10c and may be held in sealing engagement therewith by any suitable means, such as a band 13 of adhesive tape.

An annular plate means 14 is positioned in a medial portion of housing 12 and extends transversely thereof for defining an orifice 14a within housing 12 for restricting the flow of fluid therethrough. Plate means 14 may be secured in air-tight engagement with the inner periphery of housing 12 by any suitable means. For example, if housing 12 is formed of metal, plate means 14 may be soldered or welded thereto or cast integral therewith, and if housing 12 is formed of a plastic material, plate means 14 may be formed integral therewith or adhesively secured thereto. Orifice 14a is substantially concentric with the axis of housing 12, and sensing means are positioned on opposite sides of orifice 14a for sensing relatively high or positive static pressure at a plurality of points upstream of orifice 14a and for sensing static sub-atmospheric or negative pressure at a plurality of points downstream of orifice 14a.

In both embodiments of the invention, the sensing means includes a series of ports extending around the interior of the housing adjacent each side of the orifice and located radially outwardly of the orifice, with the ports facing inwardly toward the center of the housing, and at least the downstream series of ports is located substantially closer to the plate means than the extent that the plate means projects into the housing, so that the downstream series of ports is subjected to a zone or region of steady negative or sub-atmospheric pressure created immediately adjacent the downstream side of plate means and extending around the interior surface of the housing by virtue of the fluid flowing in the conduit system and through the orifice.

In the first embodiment of the invention (FIGS. 1–4) the sensing means comprises a pair of relatively small annular pipes 15, 16 positioned closely adjacent or against respective upstream and downstream sides of plate means 14 and suitably secured to the inner peripheral surface of housing 12 by any suitable means, such as welding or soldering. The annular pipes 15, 16 are provided with respective annular series of ports 15a, 16a which are preferably spaced substantially equidistantly apart from each other around the innermost surfaces of annular pipes 15, 16 so that they face inwardly toward the center of housing 12. Ports 15a, 16a may take the form of small holes drilled in the annular pipes 15, 16. The external cross-sectional diameter of each pipe 15, 16 is substantially less than the extent that plate means 14 projects into housing 12 so that the two series of ports 15a, 16a are located substantially closer to plate means 14 than the extent that the plate means projects into housing 12.

While it is important that the donwstream series of ports 16a is located substantially closer to plate means 14 than the extent that the plate means projects into housing 12, it has been found that the upstream series of ports 15a may be spaced a considerable distance upstream away from plate means 14; e.g., about 6 to 8 inches, just so long as it is subjected to a relatively high static pressure produced by the fluid flowing in the conduit system 10. In order that the apparatus may properly sense fluid flow alternatively in both directions in conduit system 10, and to facilitate ready connection of a pressure responsive means to pipes 15, 16, it is preferred that the distance from the ports 15a to the ports 16a is less than the extent that plate means 14 projects into housing 12.

From the foregoing description, it is apparent, with particular reference to FIG. 4, that the fluid flowing through conduit system 10 and housing 12 interposed therein is contracted to some small extent as it flows through orifice 14a and thus produces an annular, static pressure region on the upstream side of plate means 14 which is sensed by the ports 15a and within annular pipe 15. At the same time, the flowing fluid produces an annular region of negative or sub-atmospheric pressure on the downstream side of plate means 14 which is sensed by the downstream series of ports 16a and in the downstream annular pipe 16. It is important to note that the ports 15a, 16a are necessarily quite small and located inwardly at the innermost peripheral surfaces of annular pipes 15, 16 so that only static high pressure and static sub-atmospheric pressure are sensed by the respective series of ports 15a, 16a as opposed to the velocity or impact pressure of the flowing stream being sensed. As indicated earlier herein, a gaseous fluid flowing at a supposedly predetermined constant volume is subject to swirls and eddies, especially where the fluid flow is disturbed as by the elbow 10a, so that, in any given area of a conduit, and where the fluid is contracted through an orifice incident to obtaining a pressure drop therein, frequent variations in the velocity of the flowing fluid occur. Thus, by facing the ports 15a, 16a inwardly toward the center of the housing 12, such variations in velocity have no effect on the pressure being sensed by the ports 15a, 16a.

A pressure responsive means 20, preferably a U-tube form of manometer, is operatively connected to each series of ports 15a, 16a for determining the differential pressure on opposite sides of orifice 14a. To this end, corresponding ends of branch pipes 15b, 16b are communicatively connected to and extend outwardly from the respective annular pipes 15, 16 and through the wall of housing 12 in substantially air-tight relation thereto. Pipes 15c, 16c, which may be suitable connected to or integral with branch pipes 15b, 16b, communicatively connect branch pipes 15b, 16b to respective opposite ends of the U-tube 20a of manometer 20 so that water or other suitable liquid 20b in U-tube 20a will be displaced therein in accordance with the differential pressure on opposite sides of orifice 14a sensed by the series of ports 15a, 16a. Since the structure and function of a U-tube manometer is well-known, a further description thereof is deemed unnecessary.

In order for the apparatus to function efficiently in instances where the fluid flows alternatively in opposite directions in conduit system 10, both annular pipes 15, 16 should be positioned closely adjacent or against both the plate means 14 and the inner surface of housing 12. Also, the outside cross-sectional diameter of pipes 15, 16 should be such that ports 15a, 16a are positioned closer to plate means 12 that the extent that plate means 12 projects into housing 12, with both series of ports 15a, 16a facing inwardly perpendicular to the axis of housing 12 and to the flow of fluid therethrough, so as to insure that the upstream series of ports, in either instance, will sense relatively high static pressure only as opposed to impact pressure. Also, the downstream series of ports, in either instance, then will be positioned well within the region of static sub-atmospheric pressure of the flowing fluid. Further, the diameter of the ports 15a, 16a should be quite small so that they do not extend around the cross-sectional curvature of pipes 15, 16 to such extent as to be subject to impact pressure when on the upstream side of plate means 14 and so that there is no loss in the effectiveness of the sub-atmospheric pressure or suction acting on the ports and in the corresponding annular pipe on the downstream side of the plate means 14. Also, the diameter of ports should be quite small so that the combined cross-sectional area of the ports in each series is no greater than the internal cross-sectional area of the respective annular pipes 15 or 16.

However, if the apparatus is used in a conduit system through which the fluid flows in only one direction, as from left to right in FIG. 3 and 4, it is to be noted that the upstream annular pipe 15 then may be positioned a substantial distance away from and upstream of plate means 14, as heretofore indicated, provided that the series of ports 15a therein face inwardly perpendicular to the axis of housing 12 and to the flow of fluid therethrough, so that the upstream series of ports 15a will sense relatively high static pressure only as opposed to impact pressure. In this instance, however, downstream annular pipe 16 should be positioned closely adjacent or against the plate means 14 and the inner surface of housing 12, but the series of ports 16a may be located either so that they face inwardly perpendicular to the axis of housing 12 and to the flow of the fluid therethrough and/or they may be positioned anywhere between plate means 14 and the apex of the innermost surface of annular pipe 16, as long as they are open to the interior of housing 12 and are not positioned so close to the down-stream surface of plate means 14 that it will obstruct the flow of fluid pressure from within annular tube 16 and through the ports 16a.

The extent that plate means 14 projects into housing 12 must be sufficient to insure that the downstream ports 16a are subjected to a steady static sub-atmospheric or negative pressure at all times during flow of gaseous fluid through housing 12, even at very low velocities. However, in order to avoid unduly restricting the flow of gaseous fluid through housing 12, as is especially desirable in instances wherein the housing 12 is to remain permanently mounted in a conduit system, the diameter of orifice 14a should be as large as is practicable without sacrificing the steady static sub-atmospheric condition necessary to obtaining reliable readings at the manometer 20. To this end, experiments have shown that the orifice 14a defined by plate means 14 should have a diameter within the range of about 82 to 85 percent of the internal diameter of housing 12. For example, in a conduit having a nominal diameter of 4 inches, and an internal diameter of 3.937 inches, the inside diameter of housing 12 was about 3.937 inches and the diameter of the orifice was about 3.313 inches. As a further example, in a conduit having a nominal diameter of 10 inches and an inside diameter of about 9.937 inches, housing 12 has an internal diameter of about 9.937 inches and the diameter of orifice 14a was about 8.344 inches.

The thickness of plate means 14 may be in the range of a few thousandths of an inch to one-fourth of an inch or more provided that the thickness of the plate means 14 at the orifice 14a is no more than about five sixty-fourths to three thirty-seconds inch. It is preferred, however, that plate means 14 is relatively thin and of uniform thickness.

Regardless of the nominal diameter of housing 12, which may be in the range of about 4 inches to 10 inches, it is preferred that each of the pipes 15, 16 has a cross-sectional outside diameter of about three-sixteenths inch with an internal diameter of about one-eighth, that each of the ports has a diameter of about 0.040 inch, and that each pipe 15, 16 is provided with eight of the ports, all of the same size and uniformly spaced apart around each annular pipe 15, 16; i.e., with the ports spaced about 45° apart from each other in each of the pipes 15, 16. In such arrangement, it will be noted that the internal cross-sectional area of each pipe 15, 16 is greater than the total cross-sectional area of the respective series of ports 15a, 16a therein.

It is desirable that the internal cross-sectional area of each pipe 15, 16 is greater than the total cross-sectional area of the ports in the respective pipe since, otherwise, the manometer 20 or other pressure responsive means may be sluggish in accurately responding to any change in the volume of gaseous fluid flowing through the conduit system 10, to the extent that there might be an undesirable time lapse from the instant that a particular change in differential pressure is sensed at the series of ports 15a, 16a to the instant that such change is effective to cause a corresponding change in the manometer 20.

The modified form of the apparatus shown in FIGS. 5–7 is quite similar to the first form of the apparatus shown in FIGS. 1–4. Accordingly, those parts shown in FIGS. 5–7 which correspond to similar parts shown in FIGS. 1–4 will bear the same reference characters with the prime notation added, where applicable, to avoid repetitive description. Essentially, the modified form of the apparatus differs from the first form in that the annular pipes 15, 16 of FIGS. 2–4 are omitted and, instead, ports 15a', 16a' extend through the peripheral wall of the housing 12' of the modified form of the apparatus in FIGS. 5–7. Housing 12' also includes means 22 surrounding and carried by housing 12' in spaced overlying relation to the respective series of ports 15a', 16a' and defining respective communicating passageways 22a, 23a for the ports 15a', 16a' of each series. As shown, the passageway defining means 22 is generally channel-shaped in cross-section, provided with a dividing partition therein to form passageways 22a, 23a, and has a pair of branch pipes 22b, 23b connected thereto for communication with the respective passageways 22a, 23a. Branch pipes 22b, 23b are adapted to be connected to the pressure responsive means 20 in the same manner as that in which branch pipes 15b, 16b of the first embodiment of the invention are connected to the manometer 20 in FIG. 1.

The relationship Of between the two series of ports 15a', 16a' and the plate means 14', and the relationship between the diameter of orifice 14a' and the internal diameter of housing 12' should be substantially the same as that described with respect to the first embodiment of the invention, even though the ports 15a', 16a' are located further outwardly in a radial direction away from orifice 14a' that is the case with respect to the ports 15a, 16a relative to the orifice 14a in FIGS. 2–4. of course, similar to the first embodiment of the apparatus, the combined cross-sectional area of the ports 15a', 16a' is no greater than the internal cross-sectional area of the respective communicating passageways 22a, 23a.

The modified form of the apparatus has an advantage over the first form of the apparatus in that the ports 15a', 16a' may be positioned closer to plate means 14'. However, the first embodiment of the apparatus is preferred, as it has been determined that it may be more economically manufactured than the modified form shown in FIGS. 5–7.

The graph shown in FIGS. 8 is provided to illustrate how various readings of differential pressure on the manometer 20 may be translated into volumes of gas flow in cubic feet per minute (CFM) utilizing either form of the apparatus as described herein in conduit systems of the same internal cross-sectional area or diameter as the respective housings 12 or 12'. The volumes of gas flow were plotted on the graph of FIG. 8 by comparing various differential pressure readings reflected on the manometer 20 with the actual CFM flowing in conduits of various nominal diameters. It should be noted that the conduit diameters appearing on the right-hand side of the graph in FIG. 8 are nominal or outside diameters corresponding to conduits having internal diameters which actually are about one-sixteenth inch less than the nominal diameters appearing on the graph. The column of figures appearing on the left-hand side of the graph indicate the volume of air flow or gas flow in cubic feet per minute, and the row of figures beneath the graph represent the amount of displacement of the water column 20b in the U-tube 20a of manometer 20 in inches.

For example, utilizing a housing 12 or 12' having a 4 inch nominal diameter with elements therein arranged as described herein, a read-out of 0.80 on the manometer indicates that the air or gas is flowing through conduit means 10 of a 4 inch nominal diameter at a rate of about 200 CFM. Utilizing the same size of housing, but with the manometer 20 showing a read-out of 4.0, the graph indicates that gas is flowing through a conduit of 4 inch nominal diameter at a rate of about 450 CFM. As a further example, utilizing a housing 12 or 12' having a nominal diameter of 8 inches, with an 8 inch nominal diameter conduit system 10, upon the manometer reflecting a differential pressure read-out of 0.60, the graph indicates that gas is flowing through conduit system 10 at a rate of about 600 CFM and, if the differential read-out on manometer 20 increases to 6.0, this indicates that gas is flowing through the conduit system at a rate of about 1,950 CFM.

From the foregoing description, it is apparent that the present apparatus provides an amplified, readily visible reading on the manometer which may be readily translated into cubic feet per minute by reference to the graph shown in FIG. 8. As is well-knwon in the art, the rate of flow of an air stream varies as the density of the ambient air varies in accordance with variations in barometric pressure at different elevations above sea level, so that the volume of the air stream in cubic feet per minute through a particular size of conduit will not always be directly related to the differential pressure read-out of the gauge or manometer as reflected in the graph of FIG. 8, since the results depicted in the graph were obtained at an elevation of about 700 feet above sea level.

It is thus seen that I have provided a simple and efficient apparatus for obtaining a static pressure differential of air or gas flowing in a conduit to produce an accurate and fast read-out on a manometer which may be readily translated into the actual volume of the gas or air flowing in the conduit, and which apparatus provides an efficient accurate and fast read-out even at very low velocities. Although the housings 12, 12' and the respective series of ports have been described herein as being annular, it is to be understood that they may be of different shapes without departing from the invention.

In the drawings and specification, there have been set forth preferred embodiments of the invention and, although specific terms are employed, they are used in a generic and descriptive sense only and not for purposes of limitation.

That which is claimed is:

1. Apparatus for obtaining a pressure differential of a fluid flowing in a conduit comprising an open-ended housing adapted to be communicatively connected to a conduit for receiving the fluid flowing therethrough, plate means defining an orifice within said housing for restricting the flow of fluid therethrough, said orifice having a diameter within the range of about 82–85 percent of the internal diameter of said housing, sensing means positioned on opposite sides of said orifice for sensing static pressure at a plurality of points upstream of the orifice and for sensing sub-atmospheric pressure at a plurality of points downstream of the orifice, said sensing means including a series of ports extending around the interior of said housing on each side of said orifice and located radially outwardly of said orifice with the ports facing inwardly toward the center of the housing, at least the downstream series of ports being located substantially closer to said plate means than the extent that said plate means projects into said housing, and pressure responsive means operatively connected to each series of ports for determining the differential pressure on opposite sides of the orifice.

2. Apparatus according to claim 1 wherein the respective series of ports are similarly located at corresponding positions adjacent each side of said orifice.

3. Apparatus according to claim 1 wherein the distance between the respective series of ports is substantially less than the extent that said plate means projects into the housing.

4. Apparatus according to claim 1 wherein said sensing means comprises a relatively small annular pipe positioned on each side of said orifice with said series of ports being provided therein.

5. Apparatus according to claim 4 wherein each of said annular pipes is positioned adjacent said plate means and wherein the size and number of ports provided in each pipe are the same and wherein the internal cross-sectional area is greater than the total pipe cross-sectional area of the ports therein.

6. Aparatus according to claim 4 wherein each of said annular pipes has a series of eight ports therein, said ports all being of the same size and uniformly spaced apart.

7. Apparatus according to claim 5 wherein all of said ports have a diameter of 0.040 and are spaced about 45° apart from each other.

8. Apparatus according to claim 1 wherein said series of ports extend through said housing and said sensing means includes means surrounding and carried by the housing in spaced overlying relationship to the respective series of ports and defining respective communicating passageways for the ports of each series.

9. Apparatus for obtaining a pressure differential of fluid flowing in a conduit comprising an open-ended annular housing adapted to be communicatively connected to a conduit for receiving the fluid flowing therethrough, plate means defining an orifice within said housing for restricting the flow of fluid therethrough, sensing means positioned on opposite sides of said orifice for sensing static pressure at a plurality of points upstream of the orifice and for sensing sub-atmospheric pressure at a plurality of points downstream of the orifice, said sensing means comprising a relatively small annular pipe positioned on each side of said orifice against said housing and beside said plate means with said plate means projecting radially inwardly a substantial distance beyond the pipes, each pipe having an annular series of spaced apart ports facing inwardly toward the center of said housing and pressure responsive means operatively connected to said pipes for determining the differential pressure on opposite sides of the orifice.

10. Apparatus for obtaining a pressure differential of fluid flowing in a conduit comprising an open-ended housing adapted to be communicatively connected to a conduit for receiving the fluid flowing therethrough, said orifice having a diameter within the range of about 82–85 percent of the internal diameter of said housing, plate means defining an orifice within said housing for restricting the flow of fluid therethrough, sensing means positioned on opposite sides of said orifice for sensing static pressure at a plurality of points upstream of the orifice and for sensing sub-atmospheric pressure at a plurality of points downstream of the orifice, said sensing means including an annular series of ports extending through said housing adjacent each side of said orifice with each series of ports being located substantially closer to said plate means than the extent that said plate means projects into the housing, said sensing means also including means surrounding and carried by said housing in overlying spaced relationship to the respective series of ports and defining respective communicating passageways for the ports of each series, and pressure responsive means operatively connected to said means defining the respective passageways for determining the differential pressure on opposite sides of the orifice.

* * * * *